Inventors:
Adrian BIRBANESCU and Tiberiu RUSU
by: Arthur O. Klein
their Attorney Sept. 15, 1970    A. BIRBANESCU ET AL    3,528,524
HYDRAULIC FILMING OR TELEVISION CAMERA CRANE
Filed Nov. 22, 1965    4 Sheets-Sheet 3

Inventors:
Adrian BIRBANESCU and Tiberiu RUSU
by: Arthur O. Klein
their Attorney United States Patent Office 3,528,524
Patented Sept. 15, 1970

3,528,524
HYDRAULIC FILMING OR TELEVISION CAMERA CRANE
Adrian Birbanescu, Str. Nicolae-Iorga 32, Bucharest, Rumania, and Tiberiu Rusu, Raion Racari bd. RSR 54, Buftea, Rumania
Filed Nov. 22, 1965, Ser. No. 509,062
Claims priority, application Rumania, Nov. 27, 1964, 48,842
Int. Cl. B66f 11/04
U.S. Cl. 182—63    4 Claims

ABSTRACT OF THE DISCLOSURE

A camera crane adapted to support movie or television cameras which is mounted on its own chassis. The camera crane is operatively connected to hydraulic cylinder actuating means mounted on the same chassis. A pumping unit is adapted to pump hydraulic fluid into the hydraulic cylinder actuating means via flexible hose means being in communication on the one hand, with the pumping unit, and, on the other hand, with the hydraulic cylinder actuating means. The pumping unit being mounted on a separate support structure so that vibrations from the pumping unit during its operation are not transmitted to the camera crane.

---

This invention relates to a hydraulic camera crane designed for moving in space a cinematographical or television camera when shooting or TV broadcasting, said camera being at the same time isolated from vibrations and also noises which originate at the hydraulic pump motor.

So far for filming or television purposes hydraulic platforms have been used with the motor and pump mounted on the same chassis as the platform, and after bringing the camera into the desired position, the motor was stopped in order to avoid vibrations or noise during filming or sound recording. With such an equipment it is not possible to shoot during movement of the camera but only when the camera is in fixed positions.

Dollies are also used with hydropneumatic accumulators which make it possible while filming or TV broadcasting to change the position of the camera without producing vibrations or noise, but the duration of the movement is limited and the fluid pressure decreases continuously, so that the force available at the driving motors decreases too.

It is an object of this invention to eliminate these disadvantages by providing an equipment consisting of a filming or television camera or crane mounted on its own chassis, and a pumping unit mounted on an entirely separate structure, the hydraulic fluid being circulated between pump and crane through flexible hoses that do not transmit vibrations. Thus, the pump motor may run continuously while shooting. At the same time, the noise may be eliminated if the pump is driven by an electric motor and enclosed together with the latter in a sound proof casing, or if the whole pumping unit is located outside the sound stage, the hydraulic fluid being circulated through pipes and flexible hoses.

It is another object of this invention to facilitate the transport of the crane by having the crane structure and the pumping unit structure assembled only during the transport, the two structures being separated again for the shooting, without any other link left between them than the flexible hoses through which the hydraulic fluid is pumped and returned. The propulsion motor may be mounted either on the crane chassis or on the pump chassis, in the latter case driving also the pump.

It is a further object of this invention to provide the possibility of travelling while shooting, without subjecting the camera crane to vibrations generated by the prime mover. To this end the camera crane may be provided with hydraulic motors that receive the hydraulic fluid through flexible hoses from the pumping unit mounted on a separate chassis which is towed by the crane.

Four examples of embodiments of this invention are set forth in the following description in conjunction with the drawings (1–8), in which.

Figure 1:
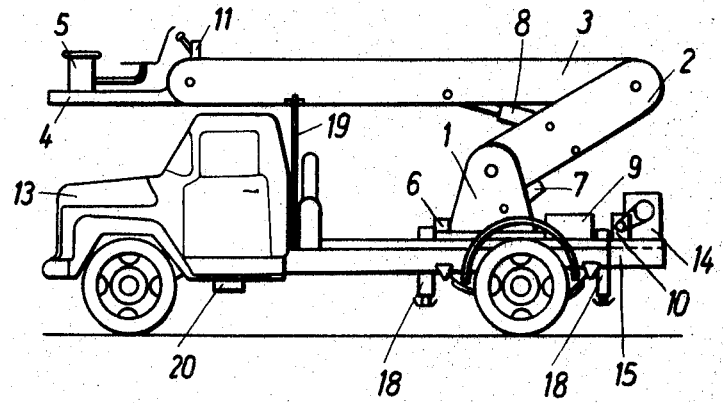
FIG. 1 is a schematic elevation of a camera crane mounted on a lorry, shown in the transport condition.
Figure 2:
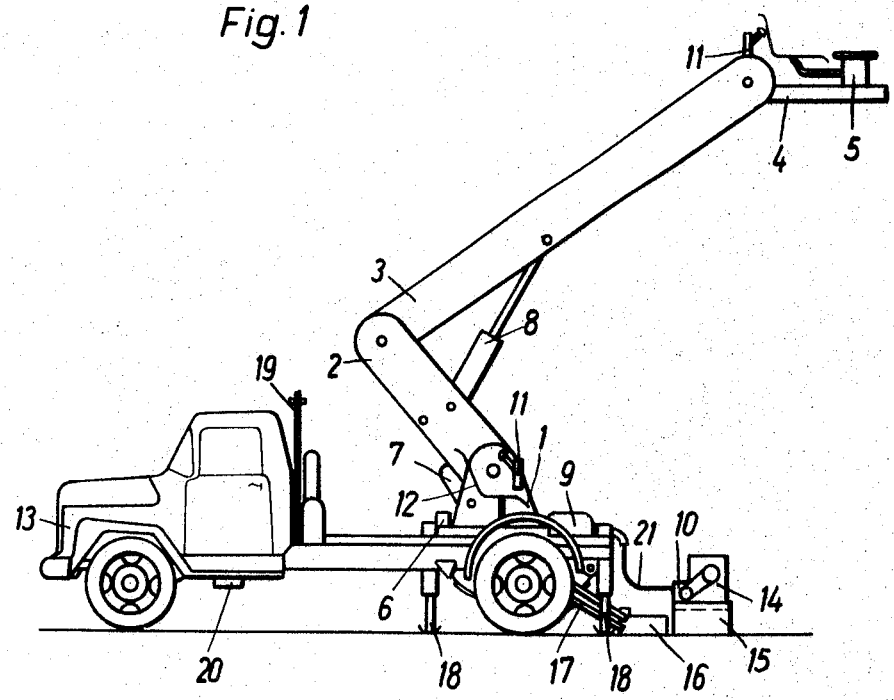
FIG. 2 is a schematic elevation of the camera crane of FIG. 2, shown in the filming condition.

The hydraulic camera crane has, in a first embodiment, a turning structure 1, a lower boom 2, an upper boom 3 and a platform 4 on which is located a column 5 supporting the camera and the seats for the cameraman and his assistant. The turning structure 1 is rotated by a hydraulic mechanism 6; the lower boom is lifted by a hydraulic cylinder 7; and the upper boom is lifted by a cylinder 8. The hydraulic fluid is pumped from a tank 9 by three pumps 10, one supplying the rotating mechanism 6, another the lower cylinder 7 and the third the upper cylinder 8. The hydraulic actuators are controlled through valves 11, some mounted down, near the turning structure where they can be reached by the crane operator, and the others up, near the platform, to be operated by the cameraman or his assistant. The camera crane is mounted on the chassis of a lorry 13. The pumps 10 are mounted together with an internal combustion motor 14 on a separate base plate 15, hoisted by a component 16 of a hydraulic parallelogram mechanism 17. The lorry is provided with two pairs of outrigger jacks 18, with a fork 19 for sustaining the upper boom 3, and a hydraulic pump 20 driven by the lorry gear box in a well known way.

During the transport the camera crane is assembled as illustrated in FIG. 1, the upper boom being fixed on the fork 19 and the base plate 15 of the pumping unit being raised. After arrival on location, the pumping unit is lowered to the ground by the mechanism 17, the lorry is pushed slightly forward in order to be separated from the base plate 15 and the fluid between the camera crane and the pumping unit is circulated through four flexible hoses 21, three of which are pressure conduits and the fourth is a suction conduit. The crane is stabilized and its axis of rotation set at the vertical by means of the outrigger jacks 18. Both the mechanism 17 and the jacks 18 are supplied with hydraulic fluid by the pump 20.

Figure 3:
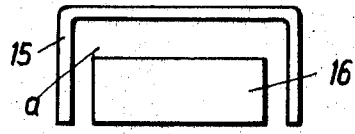
FIG. 3 is a schematic rear elevational view illustrating the relative positions of the pumping unit base plate and its hoisting gear.

From FIG. 3 it is apparent that the component 16 protrudes under the base plate 15, between them remaining a clearance "a." Owing to this arrangement the base plate 15 reaches the ground before the mechanism 17 has completed its stroke.

Figure 4:
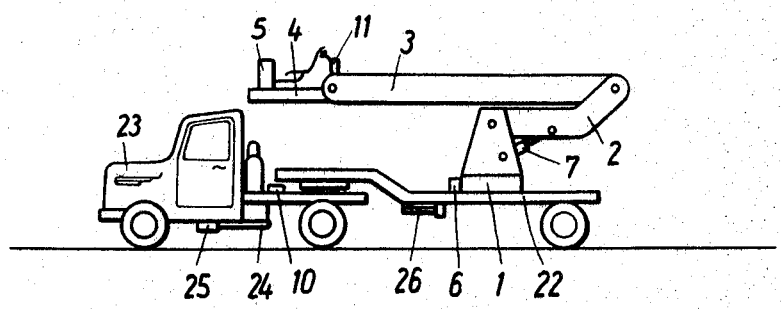
FIG. 4 is a schematic elevation of a camera crane mounted on a semitrailer which is towed by a tractor shown in the transport condition.
Figure 5:
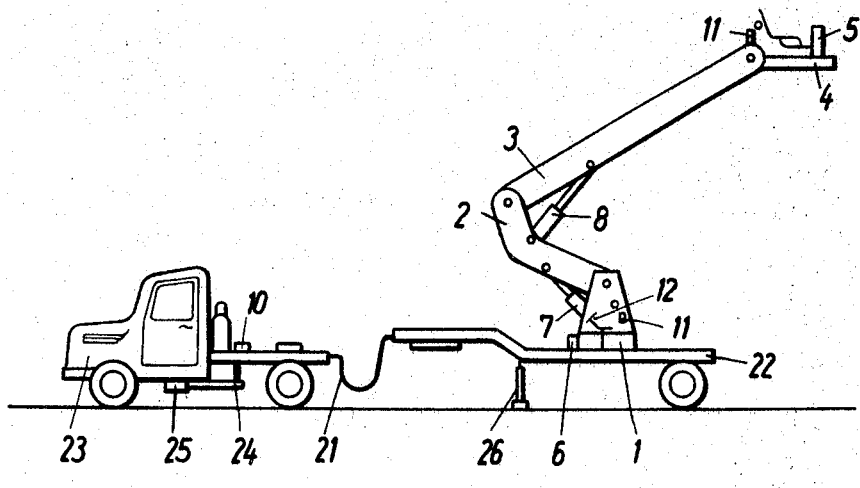
FIG. 5 is a schematic elevation of the camera crane of FIG. 4, shown in the shooting condition.

In a second embodiment, shown in FIGS. 4 and 5, a camera crane consisting essentially of the same components as the camera crane illustrated in FIG. 1 is mounted on a semitrailer 22 towed by a tractor 23. The hydraulic fluid is supplied by a set of three pumps 10, driven through a belt transmission 24 by an intermediate gear 25 coupled to the gear case of the truck. The semitrailer is provided with a pair of hydraulic jacks 26, which are retractable and are retracted during the transport of the device. After arrival on location the camera crane is separted from the tractor, as shown in FIG. 5, the jacks 26 are lowered so that the semitrailer reposes on them, and the hydraulic fluid is circulated between the camera crane and pumps through four flexible hoses 21, three of which are pressure conduits and the fourth a return one.

Figure 6:
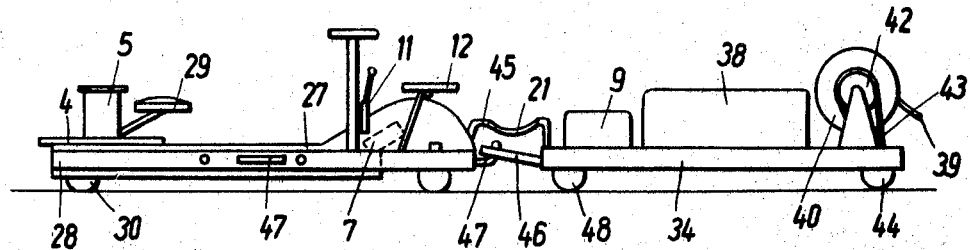
FIG. 6 is a schematic elevation of a camera crane mounted on a dolly and having a sound proofed pumping unit mounted on a separate truck.
Figure 7:
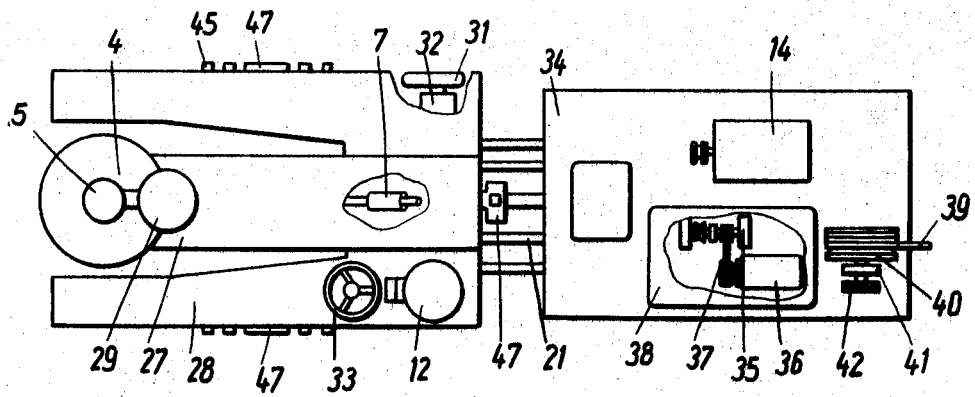
FIG. 7 is a schematic top plan view of the camera crane of FIG. 6.

In a third example of application shown in FIGS. 6 and 7, the camera crane has a single boom 27 and a chassis 28. The boom is lifted by means of a hydraulic cylinder 7, the upper end of the boom being provided with a platform 4 supporting a column 5 on which the camera, a seat 29 for the cameraman and eventually also a seat for an assistant are fixed. The chassis 28 is supported on two pairs of wheels 30 and 31, the wheels 31 being provided with hydraulic motors 32. All four wheels of the camera crane can be steered in order to permit forward or lateral travelling of the camera crane. The front wheels 30 can be steered by means of a conventional steering linkage controlled through the steering wheel 33 by the crane operator sitting on the seat 12. The hydraulic fluid is supplied by a pumping unit located on its own chassis 34 and consisting of two pumps 35, one supplying the cylinder 7 and the other the motors 32; an electric motor 36 is connected to the pumps by means of a V-belt transmission 37 and an oil tank 9 supplies the hydraulic fluid. The electric motor and the pumps are enclosed in a sound proof casing 38. Electric power is supplied from the mains or from a generating set, through a cable 39 reeled on a drum 40, which is driven by means of a friction clutch 41, a pulley 42 and a V-belt 43 by one of the rear wheels 44. Thus the mechanism pays out a length of cable equal to the distance travelled by the truck. In case there is no power supply available, the pumps 35 can be driven by an internal combustion motor 14 coupled through V-belts (not shown) to the pumps, shaft. This latter type of operation is not as noiseless, but it ensures a high degree of manuverability. The hydraulic fluid is circulated between pumps and dolly through four flexible hoses 21, two are of which are pressure conduits and two return conduits. The flexible hoses are coupled to hose connections 45. For towing, the pump unit truck is provided with a connecting rod 46 engaging a hook 47 of the dolly chassis. In order to provide also for lateral movements of the dolly, hose connections 45 and hooks 47 are mounted also on the sides of the dolly chassis. The truck 34 is mounted on two pairs of wheels 44 and 48, the front wheels 48 being steerable by means of a steering linkage controlled by the steering rod 46.

Figure 8:
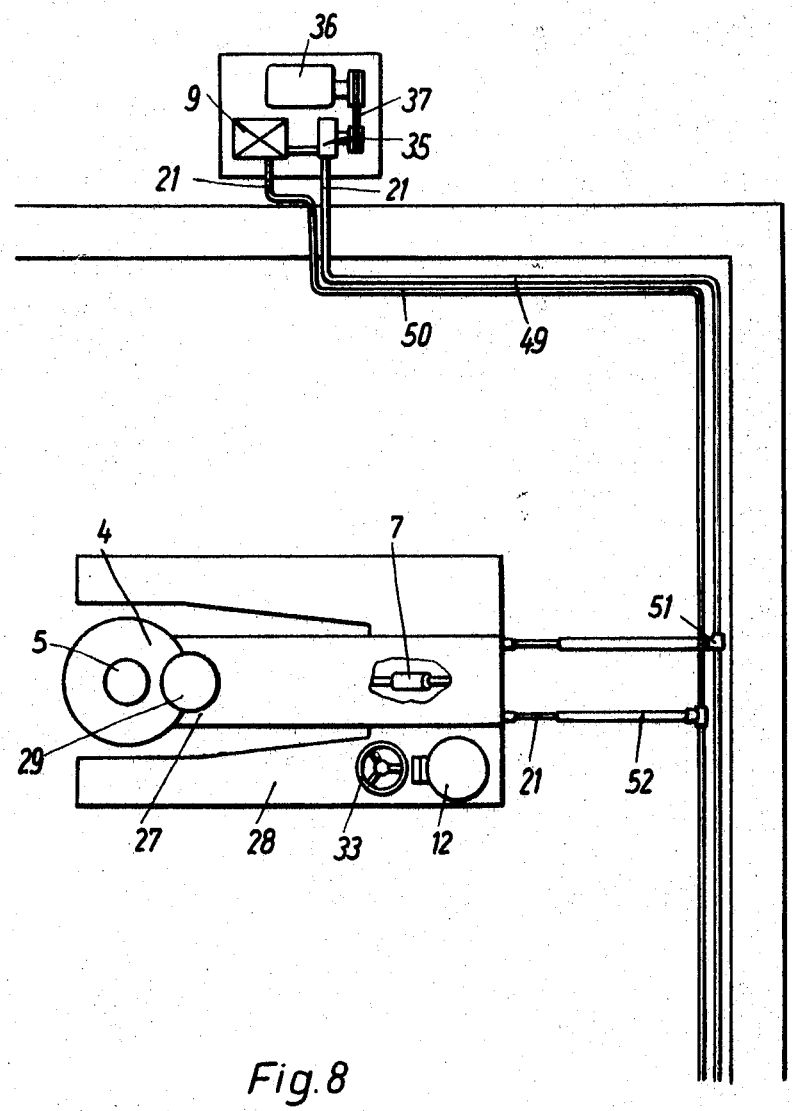
FIG. 8 is a schematic top plan view of a camera crane supplied with hydraulic fluid by a pumping unit located outside the sound stage.

A fourth example of application of the invention shown in FIG. 8 is based on the same camera crane design as in FIGS. 6 and 7, the pump unit consisting of a tank 9, a pump 35, an electric motor 36 and the belt transmission 37, said pumping unit being however situated outside the sound stage and the hydraulic fluid being supplied to the sound stage through a pressure conduit 49 and returning through a conduit 50. In order to avoid the transmission of noise into the stage, the conduits are provided, between the pumping unit and the wall, with flexible hoses 21. Inside the sound stage the conduits are provided with connections 51 to which rigid pipes 52 and flexible hoses 21 can be connected in order to assure the hydraulic circuit to the cylinder 7.

It is to be understood that in the foregoing examples it is immaterial whether the concept of the invention is applied to platforms with articulated booms or to single boom camera cranes, the particular choice made in the drawings or the descriptions being only by way of illustration. It is to be understood too that it is also possible to combine various features, e.g. to design a camera crane mounted on a lorry as illustrated in FIG. 1, but supplied with oil from a pumping unit located on a trailer similar to the truck in FIGS. 6 and 7, or to design a camera crane mounted on a semitrailer, as in FIGS. 4 and 5, but supplied with oil from a pumping unit located outside the sound stage, as shown in FIG. 8.

It will be appreciated that by application of this invention the following advantages may be obtained:

An unlimited duration of the movements during the shooting;
The elimination of vibration;
The elimination of noise, when a sound proof pumping set is used, or the hydraulic fluid is supplied from outside the sound stage;
The possibility of travelling while shooting, if the camera crane is supplied with hydraulic fluid from a unit located on a towed truck;
The possibility of adapting the principles embodied in this invention to existing platforms or camera cranes.

We claim:
1. A camera crane, comprising in combination, transport means having a chassis, hydraulic turning means operatively mounted on said chassis and adapted to turn about a substantially vertical axis, boom means pivotally connected to said turning means, first and second hydraulic actuating means respectively mounted on said chassis and said turning means and respectively operatively connected to said turning means and said boom means, third hydraulic actuating means operatively mounted on said chassis, a platform connected to said third hydraulic actuating means, a first pump and a first internal combustion engine operatively connected to each other and being mounted adapted to be supported on said platform, said third hydraulic actuating means being adapted to lower and deposit said platform on the ground, flexible hose connections connecting said first pump to said first and second hydraulic actuating means; whereby when said first pump energizes said first and second hydraulic actuating means via said flexible hose connections said turning means and boom can be selectively actuated.

2. The camera crane as claimed in claim 1, wherein said transport means include a truck having a second internal combustion engine, gear means operatively connected to said second internal combustion engine, on the one hand, and to second pump means, on the other hand, said second pump means being in communication with said third hydraulic actuating means for selectively energizing it.

3. A camera crane, comprising in combination,
transport means having a chassis;
hydraulic turning means operatively mounted on said chassis and adapted to turn about a substantially verticle axis;
boom means pivotally connected to said turning means;
first and second hydraulic actuating means respectively mounted on said chassis and said turning means and respectively operatively connected to said turning means and said boom means;
a pump operatively connected to an internal combustion engine, said pump and said engine being mounted on support means adapted to be separated from said chassis;
flexible hose connections connecting said pump to said first and second hydraulic actuating means;
whereby when said pump energizes said first and second hydraulic actuating means via said flexible hose connections said turning means and boom can be selectively actuated.

4. A camera crane according to claim 3, wherein said transport means includes a motor vehicle, and wherein said support means comprises a base plate which is adapted to be positioned on the ground adjacent to said motor vehicle when said camera crane is in use.

References Cited

UNITED STATES PATENTS

| | | | |
|---|---|---|---|
| 1,506,277 | 8/1924 | Strauss | 182—2 |
| 2,073,998 | 3/1937 | Raby | 182—2 |
| 2,450,152 | 9/1948 | Miller | 182—2 |
| 2,472,988 | 6/1949 | Furer | 182—2 |
| 2,606,078 | 8/1952 | Brock | 182—2 |
| 2,616,768 | 11/1952 | Stemm | 182—2 |
| 2,627,560 | 3/1953 | Eitel | 182—2 |
| 2,995,380 | 8/1961 | King | 182—2 |
| 3,182,827 | 5/1965 | Frost | 182—2 |

REINALDO P. MACHADO, Primary Examiner

U.S. Cl. X.R.

182—2